United States Patent
Lee et al.

(10) Patent No.: US 11,764,590 B2
(45) Date of Patent: Sep. 19, 2023

(54) BATTERY MANAGEMENT SYSTEM FOR ADJUSTING CELL BALANCING CURRENT

(71) Applicant: LG CHEM, LTD., Seoul (KR)

(72) Inventors: Ki Young Lee, Daejeon (KR); Kyoung Choon Min, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 245 days.

(21) Appl. No.: 17/279,849

(22) PCT Filed: Mar. 10, 2020

(86) PCT No.: PCT/KR2020/003302
§ 371 (c)(1),
(2) Date: Mar. 25, 2021

(87) PCT Pub. No.: WO2020/230991
PCT Pub. Date: Nov. 19, 2020

(65) Prior Publication Data
US 2021/0399553 A1 Dec. 23, 2021

(30) Foreign Application Priority Data

May 14, 2019 (KR) .................. 10-2019-0056452

(51) Int. Cl.
*H01M 10/46* (2006.01)
*H02J 7/00* (2006.01)
(Continued)

(52) U.S. Cl.
CPC ......... *H02J 7/0019* (2013.01); *H01M 10/425* (2013.01); *H01M 10/441* (2013.01);
(Continued)

(58) Field of Classification Search
CPC ............. H01M 10/425; H01M 10/482; H01M 10/441; H01M 2010/4278;
(Continued)

(56) References Cited

U.S. PATENT DOCUMENTS

| 5,998,967 A | 12/1999 | Umeki et al. |
| 2007/0188138 A1 | 8/2007 | Kobayashi |

(Continued)

FOREIGN PATENT DOCUMENTS

| CN | 101882699 B | 12/2012 |
| GB | 2558120 A | 7/2018 |

(Continued)

OTHER PUBLICATIONS

Extended European Search Report dated Mar. 29, 2022, of the corresponding European Patent Application No. 20804915.5.

(Continued)

*Primary Examiner* — Edward Tso
(74) *Attorney, Agent, or Firm* — Birch, Stewart, Kolasch & Birch, LLP

(57) ABSTRACT

A battery management system of a battery cell assembly including a plurality of cells, includes a plurality of first cell balancing resistors and a plurality of first cell balancing switches connected between a positive electrode and a negative electrode of a corresponding first cell among the plurality of cells; and a plurality of second cell balancing resistors and a plurality of second cell balancing switches connected between the positive electrode and the negative electrode of the corresponding first cell, wherein a first cell balancing current flowing during an on period of each first cell balancing switch is greater than a second cell balancing current flowing during an on period of each second cell balancing switch.

15 Claims, 9 Drawing Sheets

(51) Int. Cl.
*H01M 10/42* (2006.01)
*H01M 10/44* (2006.01)
*H01M 10/48* (2006.01)

(52) U.S. Cl.
CPC ......... *H01M 10/482* (2013.01); *H02J 7/0047* (2013.01); *H01M 2010/4271* (2013.01)

(58) Field of Classification Search
CPC ........... H01M 2010/4271; H01M 10/46; H02J 7/0016; H02J 7/0019; H02J 7/0047; Y02E 60/10
USPC ......... 320/107, 116, 117, 118, 119, 134, 136
See application file for complete search history.

(56) References Cited

U.S. PATENT DOCUMENTS

| | | | |
|---|---|---|---|
| 2007/0257642 A1* | 11/2007 | Xiao | H02J 7/00304 320/134 |
| 2013/0187611 A1 | 7/2013 | Suzuki et al. | |
| 2013/0278218 A1 | 10/2013 | Onnerud et al. | |
| 2014/0152261 A1 | 6/2014 | Yamauchi et al. | |
| 2015/0061601 A1 | 3/2015 | Hatanaka et al. | |
| 2020/0153262 A1 | 5/2020 | Yoon | |

FOREIGN PATENT DOCUMENTS

| | | | |
|---|---|---|---|
| JP | 2013-207806 A | 10/2013 | |
| JP | 2014-48281 A | 3/2014 | |
| JP | 2014-103805 A | 6/2014 | |
| JP | 5567956 B2 | 8/2014 | |
| JP | 6199294 B2 | 9/2017 | |
| JP | 2018-50454 A | 3/2018 | |
| KR | 10-2014-0126942 A | 10/2014 | |
| KR | 10-2015-0089627 A | 8/2015 | |
| KR | 10-2018-0053052 A | 5/2018 | |
| KR | 10-2019-0000142 A | 1/2019 | |
| KR | 10-2019-0047601 A | 5/2019 | |
| WO | WO 2013/153650 A1 | 10/2013 | |

OTHER PUBLICATIONS

International Search Report (PCT/ISA/210) issued in PCT/KR2020/003302, dated Jun. 29, 2020.

* cited by examiner

BATTERY MANAGEMENT SYSTEM FOR ADJUSTING CELL BALANCING CURRENT

CROSS-REFERENCE WITH RELATED APPLICATION(S)

This application claims priority to and the benefit of Korean Patent Application No. 10-2019-0056452 filed in the Korean Intellectual Property Office on May 14, 2019, the entire contents of which are incorporated herein by reference.

TECHNICAL FIELD

The present disclosure relates to a battery management system, and more particularly, to a battery management system for cell balancing control.

BACKGROUND ART

A battery management system (hereinafter referred to as "BMS") that monitors a state of a battery and controls charging and discharging of the battery controls a cell balancing operation in order to similarly maintain voltages of a plurality of cells constituting the battery. A voltage difference between the cells causes cell deterioration, which affects a lifespan thereof, and a deterioration of a cell having a cell voltage that is significantly different from that of another cell among the cells is increased, and such a cell may cause overcharging.

Among cell balancing methods, a passive cell balancing method is a method by which a resistor is connected to a cell having a great cell voltage difference with other cells to allow a current (hereinafter referred to as "a cell balancing current") to flow from the corresponding cell to the resistor. In this case, as the cell balancing current increases, a cell balancing operation time may decrease.

When cell balancing is performed using a cell monitoring IC under the control of a conventional BMS, as the cell balancing current is limited according to a function of the cell monitoring IC, there is a limit in reducing the time required for cell balancing.

DISCLOSURE

Technical Problem

The present invention has been made in an effort to provide a battery management system and a battery device including the same, capable of adjusting a cell balancing current.

Technical Solution

An exemplary embodiment of the present invention provides a battery management system of a battery cell assembly including a plurality of cells, including: a plurality of first cell balancing resistors and a plurality of first cell balancing switches, each first cell balancing resistor and each first cell balancing switch being connected between a positive electrode and a negative electrode of a corresponding first cell among the plurality of cells; and a plurality of second cell balancing resistors and a plurality of second cell balancing switches, each second cell balancing resistor and each second cell balancing switch being connected between the positive electrode and the negative electrode of the corresponding first cell. A first cell balancing current flowing during an on period of each first cell balancing switch may be greater than a second cell balancing current flowing during an on period of each second cell balancing switch.

Each first cell balancing resistor may include: a first resistor connected between the positive electrode of the respective first cell and a first end of the respective first cell balancing switch; and a second resistor connected between the negative electrode of the respective first cell and a second end of the respective first cell balancing switch.

Each second cell balancing resistor may include: a third resistor connected between the positive electrode of the respective first cell and a first end of the respective second cell balancing switch; and a fourth resistor connected between the negative electrode of the first cell and a second end of the respective second cell balancing switch.

The battery management system may turn on the first cell balancing switches and the second cell balancing switches when a voltage difference between the first cells and at least one cell adjacent to the first cells, is higher than or equal to a first reference voltage.

The battery management system may turn on each first cell balancing switch when the voltage difference is higher than or equal to a second reference voltage and lower than the first reference voltage.

The battery management system may turn on each second cell balancing switch when the voltage difference is higher than or equal to the cell balancing threshold voltage and lower than the second reference voltage.

The battery management system may, when the temperature of each first cell balancing resistor is higher than or equal to the reference temperature and the temperature of each second cell balancing resistor is lower than the reference temperature, control cell balancing of each first cell by using the respective second cell balancing resistor.

The battery management system may, when the temperature of each second cell balancing resistor is higher than or equal to the reference temperature and the temperature of each first cell balancing resistor is lower than the reference temperature, control cell balancing of each second cell by using the respective first cell balancing resistor.

Another exemplary embodiment of the present invention provides a battery management system of a battery cell assembly including a plurality of cells, including: a cell monitoring IC including a plurality of first cell balancing switches corresponding to the plurality of cells, the first cell balancing switches being connected to the plurality of cells through first cell balancing resistors; a cell balancing IC including a plurality of second cell balancing switches corresponding to the plurality of cells, the second cell balancing switches being connected to the plurality of cells through second cell balancing resistors; and a main control circuit configured to calculate a voltage difference between the plurality of cells based on received cell voltages of the plurality of cells, determine a cell balancing target cell depending on results of comparing the voltage difference between the plurality of cells with a first reference voltage, a second reference voltage, and a cell balancing threshold voltage, and control the cell balancing operation by using at least one of the cell monitoring IC and the cell balancing IC depending on the comparison results. A voltage difference between the plurality of cells may be a difference between a cell voltage of each of the plurality of cells and at least one cell adjacent to each of the plurality of cells.

A first cell balancing current flowing through a turned-on first cell balancing switch among the first cell balancing switches may be larger than a second cell balancing current flowing through a turned-on second cell balancing switch among the second cell balancing switches.

The main control circuit may control the cell monitoring IC and the cell balancing IC to turn on both the first cell balancing switch and the second cell balancing switch connected to a cell among the plurality of cells having the voltage difference that is higher than or equal to the first reference voltage.

The main control circuit may control the cell monitoring IC and the cell balancing IC to turn on the first cell balancing switch connected to a cell among the plurality of cells having the voltage difference that is higher than or equal to a second reference voltage and lower than the first reference voltage.

The main control circuit may control the cell monitoring IC and the cell balancing IC to turn on the respective second cell balancing switch connected to a cell among the plurality of cells having the voltage difference that is higher than or equal to a cell balancing threshold voltage and lower than the second reference voltage.

The main control circuit may control the cell monitoring IC and the cell balancing IC to perform cell balancing of a first cell among the plurality of cells by using the respective second cell balancing resistor connected to the first cell, when a temperature of the respective first balancing resistor of the first cell is equal to or higher than a reference temperature.

The main control circuit may control the cell monitoring IC and the cell balancing IC to perform cell balancing of a first cell among the plurality of cells by using the respective first cell balancing resistor, when a temperature of the respective second balancing resistor is equal to or higher than a reference temperature.

Advantageous Effects

It is possible to provide a battery management system and a battery device that can improve accuracy of cell balancing by adjusting the cell balancing current and can shorten a cell balancing operation time.

MODE FOR INVENTION

Figure 1:
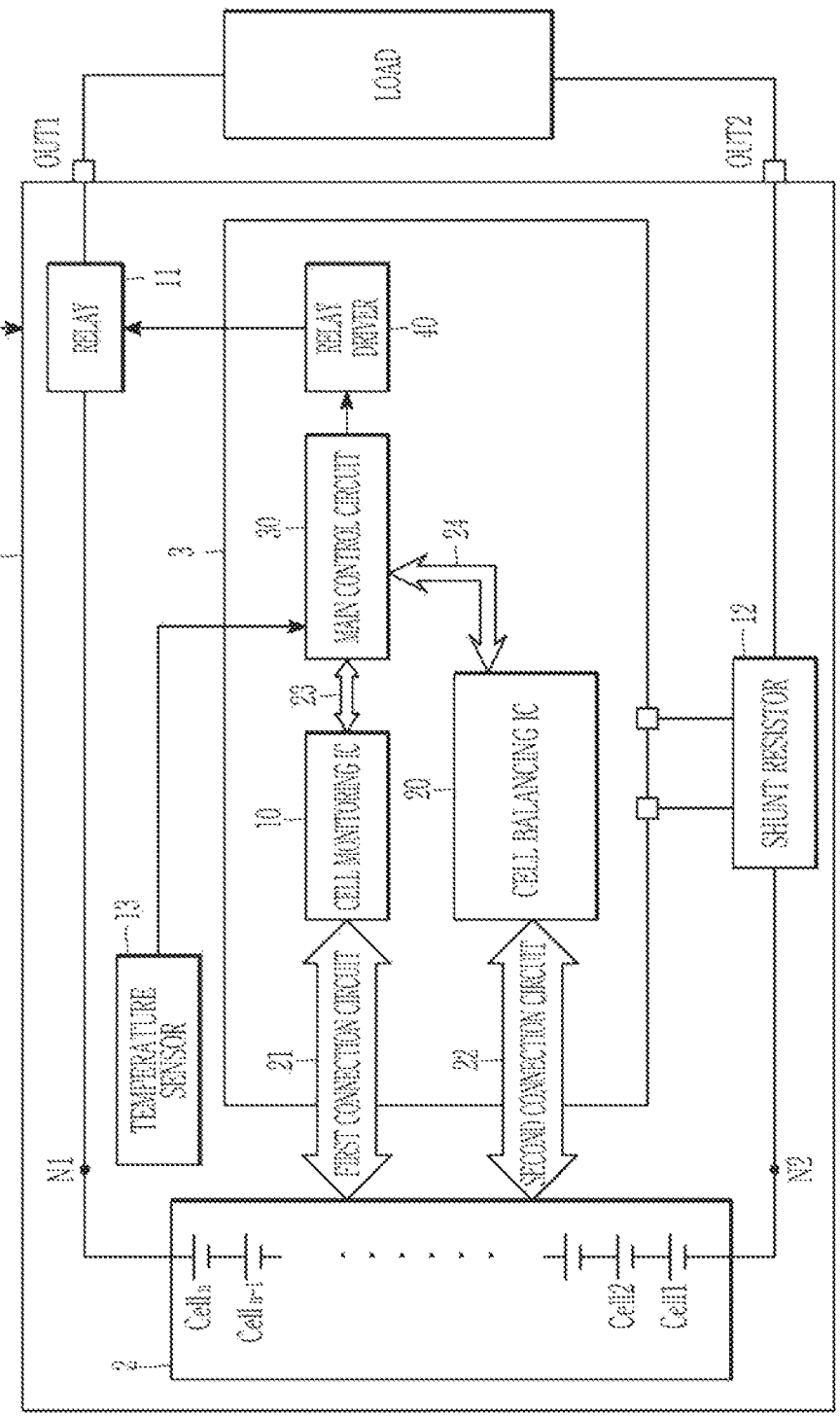
FIG. 1 illustrates a battery device according to an exemplary embodiment.

According to an exemplary embodiment of the present invention, a battery management system includes not only a cell monitoring IC but also a cell balancing IC, and the cell balancing IC provides a cell balancing current (hereinafter referred to as "a second cell balancing current") that is different from a cell balancing current (hereinafter referred to as "a first cell balancing current") of the cell monitoring IC. When a voltage difference between one cell and another cell that is adjacent to the cell among a plurality of cells (hereinafter referred to as a "a voltage difference between cells") is equal to or greater than a predetermined cell balancing threshold voltage, a cell balancing operation may be performed on the corresponding cell (hereinafter a cell balancing target cell) depending on a result of comparison with at least two reference voltages, i.e., a first reference voltage and a second reference voltage, by using at least one of a first cell balancing current and a second cell balancing current. The first cell balancing current may be larger than the second cell balancing current.

In this case, the cell balancing operation may be performed by using only one of the first cell balancing current and the second cell balancing current depending on temperatures of a resistor for cell balancing of the cell monitoring IC (hereinafter referred to as a first cell balancing resistor) and a resistor for cell balancing of the cell balancing IC (hereinafter referred to as a second cell balancing resistor) as well as the cell voltage difference.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention. It will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

It will be further understood that terms "comprise" or "have" used in the present specification specifies the presence of stated features, numerals, steps, operations, components, parts, or a combination thereof, but does not preclude the presence or addition of one or more other features, numerals, steps, operations, components, parts, or a combination thereof.

FIG. 1 illustrates a battery device according to an exemplary embodiment.

As illustrated in FIG. 1, the battery device 1 includes a battery cell assembly 2, a BMS 3, a relay 11, a shunt resistor 12, and a temperature sensor 13.

In the battery cell assembly 2, a plurality of battery cells are connected in series or parallel to supply necessary power. In FIG. 1, the battery cell assembly 2 includes a plurality of battery cells Cell1 to Celln that are connected in series and is connected between two output terminals OUT1 and OUT2 of the battery device 1, the relay 11 is connected between a positive electrode of the battery device 1 and the output terminal OUT1, and the shunt resistor 12 is connected between a negative electrode of the battery device 1 and the output terminal OUT2. The constituent elements illustrated in FIG. 1 and a connection relationship between the constituent elements are examples, and the present invention is not limited thereto.

The relay 11 controls electrical connection between the battery device 1 and a load. When the relay 11 is turned on, the battery device 1 and the load are electrically connected to perform charging or discharging, and when the relay 11 is turned off, the battery device 1 and the load are electrically separated.

The shunt resistor 12 is connected in series to a current path between the battery cell assembly 2 and the load (not illustrated). The BMS 3 may measure a voltage across the shunt resistor 12 to calculate a current flowing through the battery cell assembly 2, that is, a charge current and a discharge current.

The temperature sensor 13 may be disposed at a predetermined position within the battery device 1, e.g., in an area that is adjacent to the battery cell assembly 2, or may be physically coupled to the battery cell assembly 2. The temperature sensor 13 may detect a temperature of the position at which it is disposed, and transmit information indicating the detected temperature to the BMS 3. Although not illustrated in FIG. 1, at least two temperature sensors 13 may be provided to measure a temperature of each of the first cell balancing resistor and the second cell balancing resistor, or to provide temperature information for estimating the temperature of each of the first cell balancing resistor and the second cell balancing resistor. The first cell balancing resistor is connected between a cell monitoring IC 10 and the cells Cell1 to Celln, and thus when performing cell balancing, the first cell balancing current flows through the first cell balancing resistor. The second cell balancing resistor is connected between a cell balancing IC 20 and the cells Cell1 to Celln, and thus when performing cell balancing, the second cell balancing current flows through the second cell balancing resistor.

The BMS 3 includes a first connection circuit 21, a second connection circuit 22, the cell monitoring IC 10, the cell balancing IC 20, a main control circuit 30, and a relay driver 40.

The cell monitoring IC 10 and the battery cell assembly 2 may be electrically connected through the first connection circuit 21, and the cell balancing IC 10 and the battery cell assembly 2 may be electrically connected through the second connection circuit 22.

The cell monitoring IC 10 may be electrically connected to each of the cells through the first connection circuit 21 to measure a cell voltage, and may measure a current flowing through the battery (hereinafter referred to as "battery current") based on the voltage across the shunt resistor 12. Information related to the cell voltage and the battery current measured by the cell monitoring IC 10 is transmitted to the main control circuit 30 through an interface 23. The cell monitoring IC 30 may discharge a cell balancing cell among the cells Cell1 to Celln by using the first cell balancing resistor depending on a cell balancing control signal (hereinafter referred to as "a first cell balancing control signal") transmitted from the main control circuit 30 through the interface 23.

The cell balancing IC 20 may be electrically connected to each of the cells through the second connection circuit 22 to measure the cell voltage, and may measure the battery current based on the voltage across the shunt resistor 12. Information related to the cell voltage and the battery current measured by the cell balancing IC 20 is transmitted to the main control circuit 30 through an interface 24. The cell balancing IC 30 may discharge a cell balancing cell among the cells Cell1 to Celln by using the second cell balancing resistor depending on a cell balancing control signal (hereinafter referred to as "a second cell balancing control signal") transmitted from the main control circuit 30 through the interface 24.

In addition, the cell monitoring IC 10 and the cell balancing IC 20 may control a plurality of cell control operations required for a protection operation depending on protection operation control signals transmitted from the main control circuit 30 through the corresponding interface 23 or 24. For example, the protection operation includes a protection operation for a cell overvoltage, a protection operation for a cell low voltage, a protection operation for a short circuit, a protection operation for an overcurrent, and the like.

The main control circuit 30 may receive a wake-up signal from, e.g., an electronic control unit (ECU) 5 of a vehicle from the outside so as to activate the cell balancing IC 20 and the cell monitoring IC 10 which are in a sleep state. In addition, the wake-up signal may be transmitted to the main control circuit 30 when an abnormal voltage that is equal to or higher than a certain level at a cell side is detected by at least one of the cell balancing IC 20 and the cell monitoring IC 10.

The main control circuit 30 may control an operation of the relay 11 based on state information received through the interface 23 and the interface 24 from the cell monitoring IC 10 and the cell balancing IC 20, respectively, and may control cell balancing by controlling at least one of the cell monitoring IC 10 and the cell balancing IC 20.

Specifically, the main control circuit 30 calculates a voltage difference between the cells for each cell of the cells based on received cell voltages of the cells Cell1 to Celln, determines a cell balancing target cell depending on results of comparing the voltage difference between the cells with the first reference voltage, the second reference voltage, and the cell balancing threshold voltage, and controls the cell balancing operation by using at least one of the cell monitoring IC 10 and the cell balancing IC 20 depending on the comparison results.

According to an exemplary embodiment, the voltage difference between cells may be a difference between a cell voltage of each cell and a cell voltage of at least one cell adjacent to each cell among the cells Cell1 to Celln. For example, at least one of the adjacent cells disposed above and below each cell may be the adjacent cell. In the cell balancing, a voltage difference between two adjacent cells may be specified based on a low voltage cell.

When the voltage difference between the cells is equal to or higher than the first reference voltage, the main control circuit 30 may control the cell monitoring IC 10 and the cell balancing IC 20 to turn on both of a first cell balancing switch and a second cell balancing switch connected to cells having a voltage difference between cells that is equal to or higher than the first reference voltage. The main control circuit 30 may control the cell monitoring IC 10 and the cell balancing IC 20 to turn on the first cell balancing switch connected to cells having a voltage difference between cells that is equal to or higher than the second reference voltage and lower than the first reference voltage. The main control circuit 30 may control the cell monitoring IC 10 and the cell balancing IC 20 to turn on the second cell balancing switch connected to cells having a voltage difference between cells that is equal to or higher than the cell balancing threshold voltage and lower than the second reference voltage.

In addition, the main control circuit 30 may control the cell monitoring IC 10 and the cell balancing IC 20 to perform cell balancing of a first cell by using the second cell balancing resistor connected to the first cell, for the first cell that is connected to a first cell balancing resistor having a temperature that is equal to or higher than a reference temperature among a plurality of first cell balancing resistors. In addition, the main control circuit 30 may control the cell monitoring IC 20 and the cell balancing IC 10 to perform cell balancing of a first cell by using the first cell balancing resistor connected to the first cell, for the first cell that is connected to a second cell balancing resistor having a temperature that is equal to or higher than the reference temperature among a plurality of second cell balancing resistors.

With respect to the cell balancing, the main control circuit 30 may transmit the first cell balancing control signal and the second cell balancing control signal to control the cell monitoring IC 20 and cell balancing IC 10.

In addition, when it is determined that an abnormal state such as a cell overvoltage, a cell undervoltage, a short circuit, or an overcurrent has occurred based on the state information, the main control circuit 30 may generate a protection operation control signal for driving a protection operation corresponding to the abnormal state that has occurred and transmit it to the cell monitoring IC 10 and the cell balancing IC 20. The main control circuit 30 may transmit information related to the battery device 1 through CAN communication with the ECU 5, and may receive an instruction related to an operation of the battery device 1 from the ECU, so as to control the relay 11, the cell monitoring IC 10, and the cell balancing IC 20.

The configuration of the battery device 1 according to the present exemplary embodiment has been described with reference to FIG. 1, and each constituent element will be described later with reference to FIG. 2 to FIG. 7.

Figure 2:
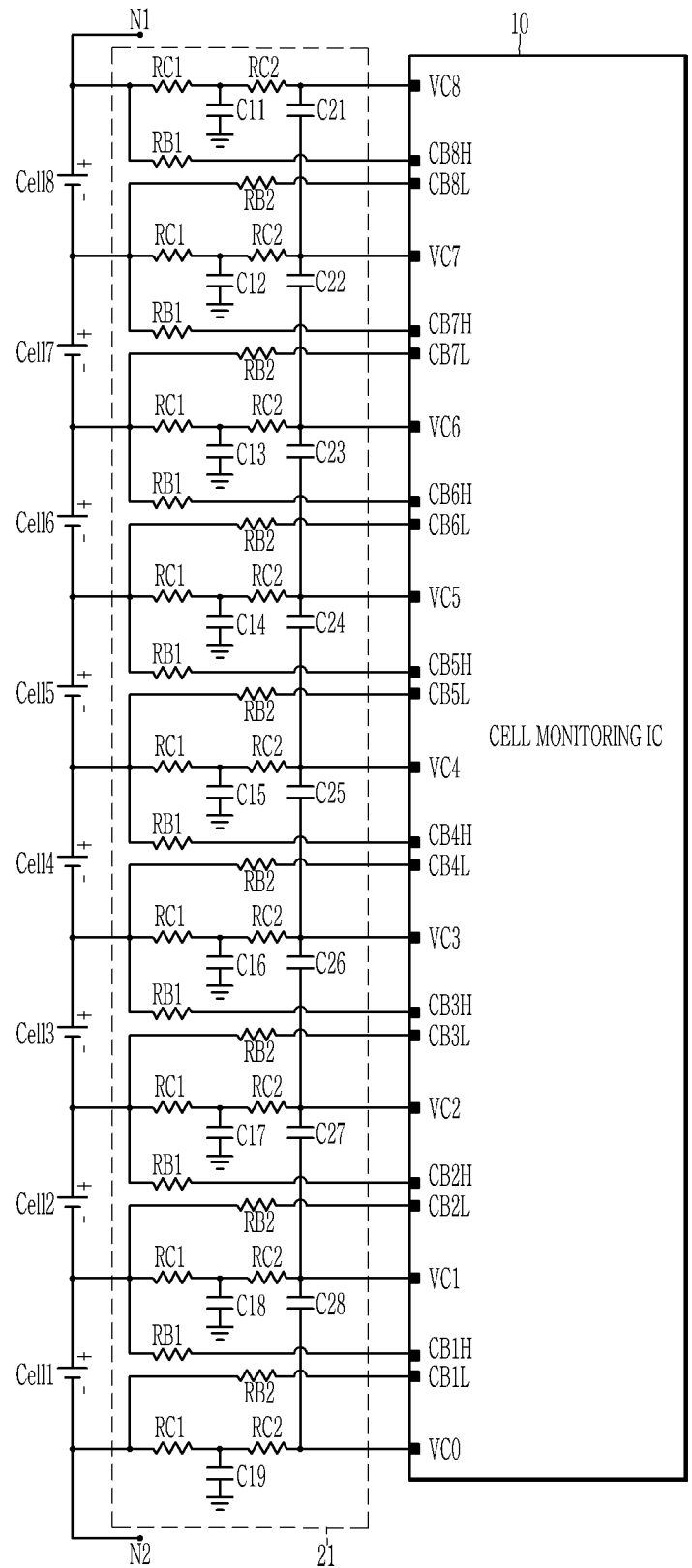
FIG. 2 illustrates a first connection circuit between a cell monitoring IC and a battery cell assembly according to an exemplary embodiment

FIG. 2 illustrates a first connection circuit between a cell monitoring IC and a battery cell assembly according to an exemplary embodiment In FIG. 2, the battery cell assembly 2 is illustrated as including eight cells Cell1 to Cell8 connected in series, but the present invention is not limited thereto. In FIG. 2, the first cell balancing resistor includes two cell balancing resistors RB1 and RB2. The temperature sensor 13 may include a temperature sensor disposed adjacent to the resistors RB1 and RB2.

The first connection circuit 21 includes a plurality of resistors RC1 and RC2, a plurality of cell balancing resistors RB1 and RB2, and a plurality of capacitors C11 to C19 and C21 to C28. The cell monitoring IC 10 includes a plurality of terminals VC0 to VC8 for cell voltage sensing and a plurality of terminals CB1H to CB8H and CB1L to CB8L for cell balancing.

In FIG. 2, two resistors RC1 and RC2 are connected in series between a positive electrode of a cell Cell1 and a terminal VCi.

Alternatively, the two resistors RC1 and RC2 are connected in series between a negative electrode of the cell Celli and a terminal VC(i−1) (i is one of the natural numbers from 1 to 8).

Specifically, the terminal VC8 is connected to the positive electrode of the cell Cell8 through two resistors RC1 and RC2. The terminal VC7 is connected to a node to which the negative electrode of the cell Cell8 and the positive electrode of the cell Cell7 are connected, through two resistors RC1 and RC2. The terminal VC6 is connected to a node to which the negative electrode of the cell Cell7 and the positive electrode of the cell Cell6 are connected, through two resistors RC1 and RC2. The terminal VC5 is connected to a node to which the negative electrode of the cell Cell6 and the positive electrode of the cell Cell5 are connected, through two resistors RC1 and RC2. The terminal VC4 is connected to a node to which the negative electrode of the cell Cell5 and the positive electrode of the cell Cell4 are connected, through two resistors RC1 and RC2. The terminal VC3 is connected to a node to which the negative electrode of the cell Cell4 and the positive electrode of the cell Cell3 are connected, through two resistors RC1 and RC2. The terminal VC2 is connected to a node to which the negative electrode of the cell Cell3 and the positive electrode of the cell Cell2 are connected, through two resistors RC1 and RC2. The terminal VC1 is connected to a node to which the negative electrode of the cell Cell2 and the positive electrode of the cell Cell1 are connected, through two resistors RC1 and RC2. The terminal VC0 is connected to the negative electrode of the cell Cell1 through two resistors RC1 and RC2.

In FIG. 2, the cell balancing resistor RB1 is connected between the positive electrode of the cell Celli and a terminal CBiH, and the cell balancing resistor RB2 is connected in series between the negative terminal of the cell Celli and a terminal CBiL (i is one of the natural numbers from 1 to 8).

Specifically, the terminal CB8H is connected to the positive electrode of the cell Cell8 through the cell balancing resistor RB1, and the terminal CB8L is connected to the negative electrode of the cell Cell8 through the cell balancing resistor RB2. The terminal CB7H is connected to the positive electrode of the cell Cell7 through the cell balancing resistor RB1, and the terminal CB7L is connected to the negative electrode of the cell Celli through the cell balancing resistor RB2. The terminal CB6H is connected to the positive electrode of the cell Cell6 through the cell balancing resistor RB1, and the terminal CB6L is connected to the negative electrode of the cell Cell6 through the cell balancing resistor RB2. The terminal CB5H is connected to the positive electrode of the cell Cell5 through the cell balancing resistor RB1, and the terminal CB5L is connected to the negative electrode of the cell Cell5 through the cell balancing resistor RB2. The terminal CB4H is connected to the positive electrode of the cell Cell4 through the cell balancing resistor RB1, and the terminal CB4L is connected to the negative electrode of the cell Cell4 through the cell balancing resistor RB2. The terminal CB3H is connected to the positive electrode of the cell Cell3 through the cell balancing resistor RB1, and the terminal CB3L is connected to the negative electrode of the cell Cell3 through the cell balancing resistor RB2. The terminal CB2H is connected to the positive electrode of the cell Cell2 through the cell balancing resistor RB1, and the terminal CB2L is connected to the negative electrode of the cell Cell2 through the cell balancing resistor RB2. The terminal CB1H is connected to the positive electrode of the cell Cell1 through the cell balancing resistor RB1, and the terminal CB1H is connected to the negative electrode of the cell Cell1 through the cell balancing resistor RB2.

Each of the capacitors C11 to C19 is formed between a connection node between the two corresponding resistors RC1 and RC2 and the ground, and the capacitors C21 to C28 is formed between two corresponding terminals among the terminals VC0 to VC8.

Figure 3:
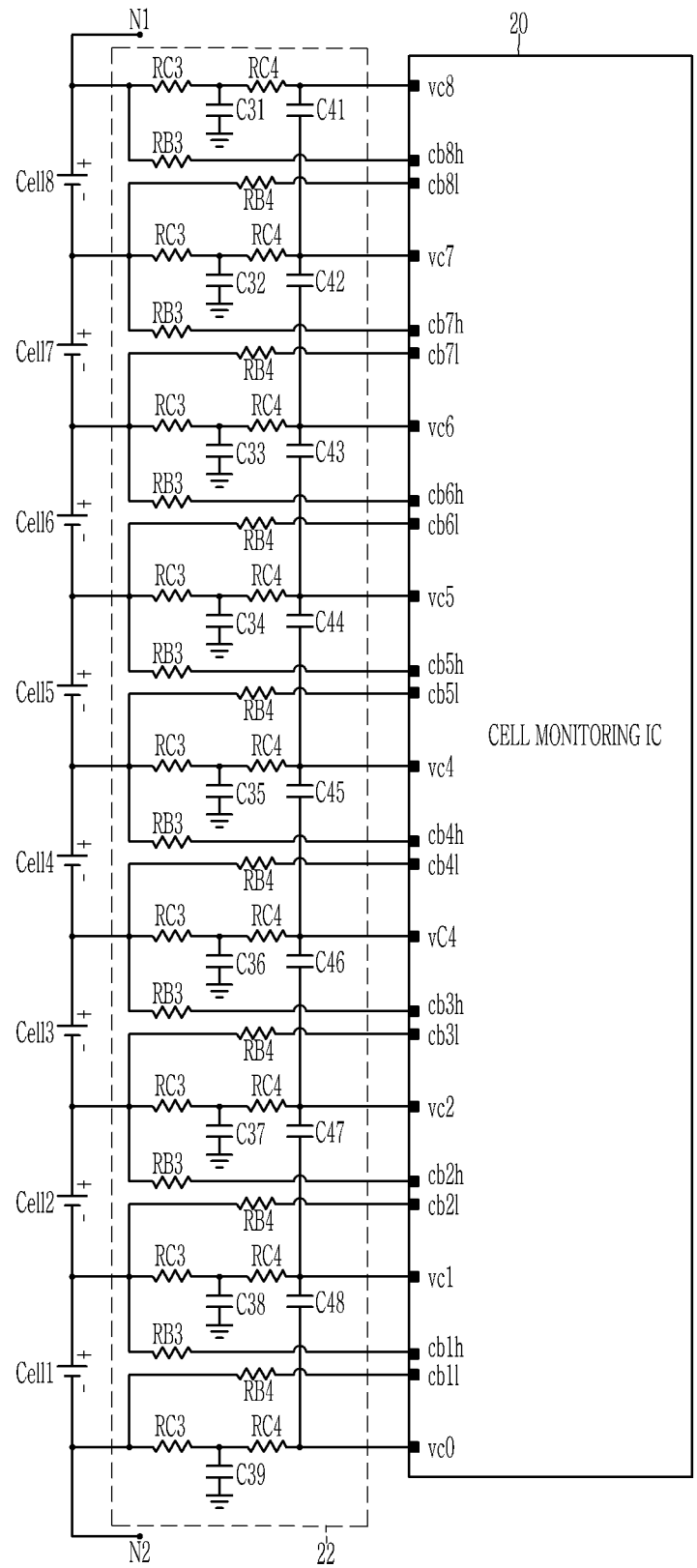
FIG. 3 illustrates a second connection circuit between a cell balancing IC and a battery cell assembly according to an exemplary embodiment.

FIG. 3 illustrates a second connection circuit between a cell balancing IC and a battery cell assembly according to an exemplary embodiment.

In FIG. 3, the battery cell assembly 2 is illustrated as including cells Cell1 to Cell8 connected in series, but the present invention is not limited thereto. In FIG. 3, the second cell balancing resistor includes two cell balancing resistors RB3 and RB4. The temperature sensor 13 may include a temperature sensor disposed adjacent to the resistors RB3 and RB4.

The second connection circuit 22 includes a plurality of resistors RC3 and RC4, a plurality of cell balancing resistors RB3 and RB4, and a plurality of capacitors C31 to C39 and C41 to C48. The cell balancing IC 20 includes a plurality of terminals vc0 to vc8 for cell voltage sensing and a plurality of terminals CB1$h$ to CB8$h$ and CB1$l$ to CB8$l$ for cell balancing. In FIG. 3, two resistors RC3 and RC4 are connected in series between a positive electrode of a cell Cell$i$ and a terminal vc$i$. Alternatively, the two resistors RC3 and RC4 are connected in series between a negative electrode of the cell Cell$i$ and aa terminal vc(i−1) (i is one of the natural numbers from 1 to 8).

Specifically, the terminal vc8 is connected to the positive electrode of the cell Cell8 through two resistors RC3 and RC4. The terminal vc7 is connected to a node to which the negative electrode of the cell Cell8 and the positive electrode of the cell Cell7 are connected, through two resistors RC3 and RC4. The terminal vc6 is connected to a node to which the negative electrode of the cell Cell7 and the positive electrode of the cell Cell6 are connected, through two resistors RC3 and RC4. The terminal vc5 is connected to a node to which the negative electrode of the cell Cell6 and the positive electrode of the cell Cell5 are connected, through two resistors RC3 and RC4. The terminal vc4 is connected to a node to which the negative electrode of the cell Cell5 and the positive electrode of the cell Cell4 are connected, through two resistors RC3 and RC4. The terminal vc3 is connected to a node to which the negative electrode of the cell Cell4 and the positive electrode of the cell Cell3 are connected, through two resistors RC3 and RC4. The terminal vc2 is connected to a node to which the negative electrode of the cell Cell3 and the positive electrode of the cell Cell2 are connected, through two resistors RC3 and RC4. The terminal vc1 is connected to a node to which the negative electrode of the cell Cell2 and the positive electrode of the cell Cell1 are connected, through two resistors RC3 and RC4. The terminal vc0 is connected to the negative electrode of the cell Cell1 through two resistors RC3 and RC4.

In FIG. 3, the cell balancing resistor RB3 is connected between the positive electrode of the cell Cell$i$ and a terminal cb$i$h, and the cell balancing resistor RB2 is connected in series between the negative electrode of the cell Cell$i$ and a terminal cb$i$l (i is one of the natural numbers from 1 to 8).

Specifically, the terminal cb8$h$ is connected to the positive electrode of the cell Cell8 through the cell balancing resistor RB3, and the terminal cb8$l$ is connected to the negative electrode of the cell Cell7 through the cell balancing resistor RB4. The terminal cb7$h$ is connected to the positive electrode of the cell Cell7 through the cell balancing resistor RB3, and the terminal cb7$l$ is connected to the negative electrode of the cell Cell7 through the cell balancing resistor RB4. The terminal cb6$h$ is connected to the positive electrode of the cell Cell6 through the cell balancing resistor RB3, and the terminal cb6$l$ is connected to the negative electrode of the cell Cell6 through the cell balancing resistor RB4. The terminal cb5$h$ is connected to the positive electrode of the cell Cell5 through the cell balancing resistor RB3, and the terminal cb5$l$ is connected to the negative electrode of the cell Cell5 through the cell balancing resistor RB4. The terminal cb4$h$ is connected to the positive electrode of the cell Cell4 through the cell balancing resistor RB3, and the terminal cb4$l$ is connected to the negative electrode of the cell Cell4 through the cell balancing resistor RB4. The terminal cb3$h$ is connected to the positive electrode of the cell Cell3 through the cell balancing resistor RB3, and the terminal cb3$l$ is connected to the negative electrode of the cell Cell3 through the cell balancing resistor RB4. The terminal cb2$h$ is connected to the positive electrode of the cell Cell2 through the cell balancing resistor RB3, and the terminal cb2$l$ is connected to the negative electrode of the cell Cell8 through the cell balancing resistor RB4. The terminal cb1$h$ is connected to the positive electrode of the cell Cell$i$ through the cell balancing resistor RB3, and the terminal cb1$h$ is connected to the negative electrode of the cell Cell1 through the cell balancing resistor RB4.

Each of the capacitors C31 to C39 is formed between a connection node between the two corresponding resistors RC3 and RC4 and the ground, and the capacitors C41 to C48 are formed between two corresponding terminals among the terminals vc0 to vc8.

Figure 4:
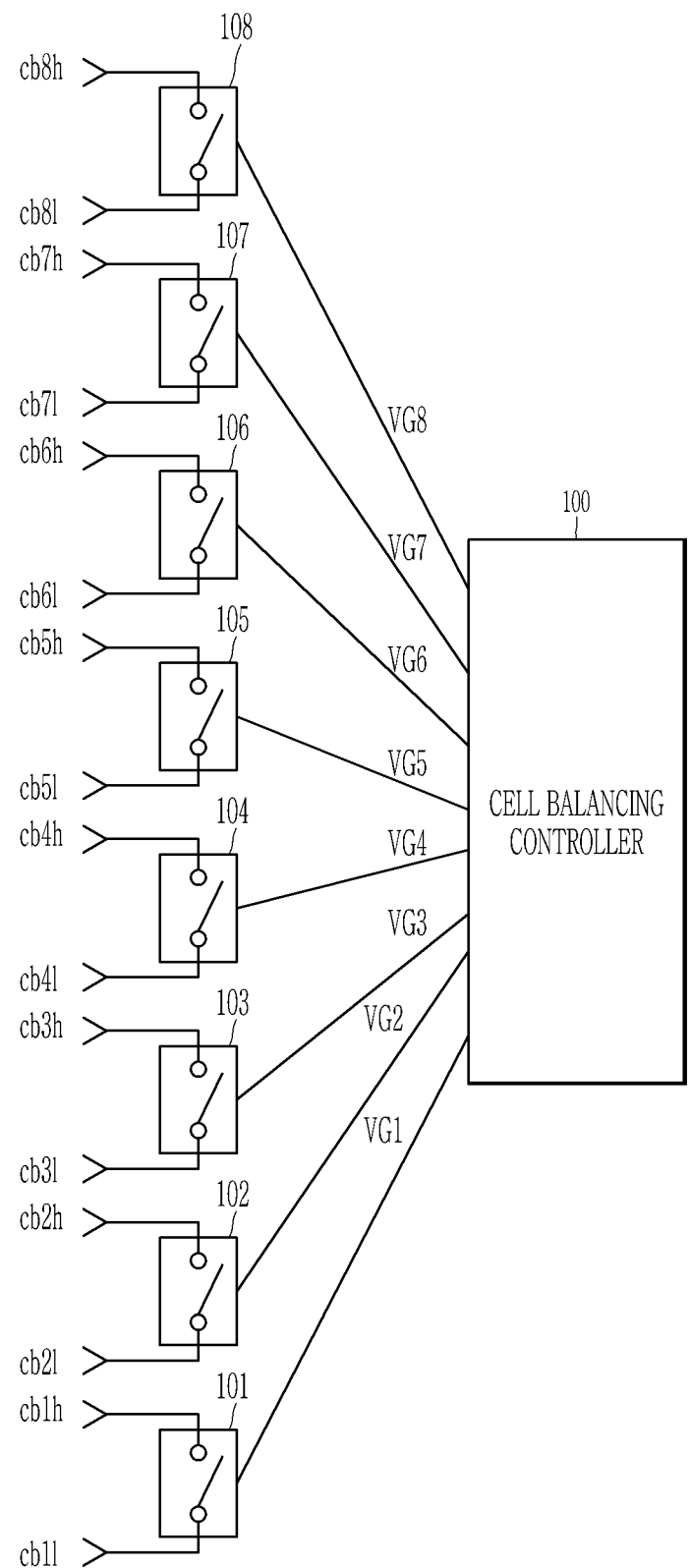
FIG. 4 illustrates a partial configuration of a cell balancing IC according to an exemplary embodiment.

FIG. 4 illustrates a partial configuration of a cell balancing IC according to an exemplary embodiment.

The cell balancing IC 20 may include a plurality of cell balancing switches 101 to 108 and a cell balancing controller 100. Each of the cell balancing switches 101 to 108 may be connected between two corresponding terminals, and may perform a switching operation depending on a corresponding gate signal.

The cell balancing controller 100 turns on the cell balancing switch connected to the cell balancing cell depending on the cell balancing control signal received from the main control circuit 30. An on period of the cell balancing switch may also depend on the cell balancing control signal.

Each of the cell balancing switches 101 to 108 may have a first end connected to the terminal cb$i$h and a second end connected to the terminal cb$i$l, and may perform the switching operation depending on a corresponding gate signal VG$i$. When the cell balancing switch 10$i$ is turned on, the cell Cell$i$ and the cell balancing resistors RB3 and RB4 form a discharge path to discharge the cell Celli (i is one of the natural numbers from 1 to 8).

The cell balancing switches 101 to 108 and the cell balancing controller 100 illustrated in FIG. 4 may also be applied to the cell monitoring IC 10. In this case, the cell balancing switch 101 to 108 and the cell balancing controller 100 may be applied to the terminals CB1H to CB8H and CB1L to CB8L instead of the terminals cb1$h$ to cb8$h$ and cb1$l$ to cb8$l$ illustrated in FIG. 4.

Figure 5:
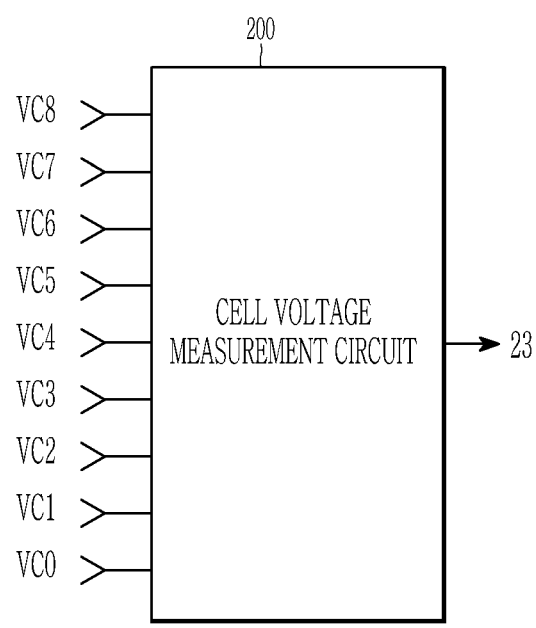
FIG. 5 illustrates a partial configuration of a cell monitoring IC according to an exemplary embodiment.

FIG. 5 illustrates a partial configuration of a cell monitoring IC according to an exemplary embodiment.

The cell monitoring IC 10 may include a cell voltage measurement circuit 200. The cell voltage measurement circuit 200 may measure a voltage between two adjacent terminals among the terminals VC8 to VC0 to transmit information indicating the measured cell voltage to the main control circuit 30 through the interface 23. The voltage between the terminal VCi and the terminal VC(i−1) is the cell voltage of the cell Celli (i is one of the natural numbers from 1 to 8).

The cell voltage measurement circuit 200 illustrated in FIG. 5 may also be applied to the cell balancing IC 20. In this case, the cell voltage measurement circuit 200 may be applied to the terminals cb1$h$-cb8$h$ and cb1$l$-cb8$l$ instead of the terminals CB1H to CB8H and CB1L to CB8L illustrated in FIG. 5.

A connection relationship between a cell, a cell balancing resistor, and a cell balancing switch will be described in detail with reference to FIG. 6 and FIG. 7.

Figure 6:
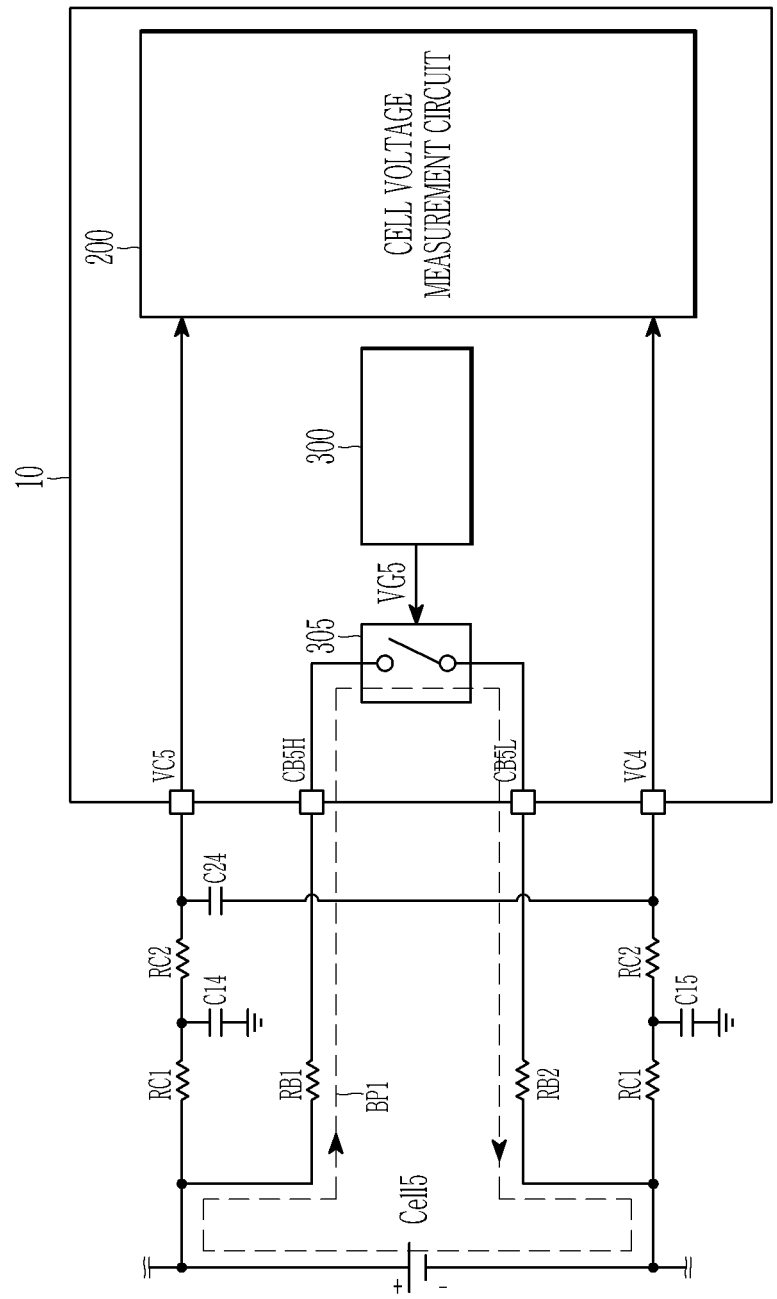
FIG. 6 illustrates a partial configuration showing a connection relationship between a cell monitoring IC and a battery cell assembly according to an exemplary embodiment.

FIG. 6 illustrates a partial configuration showing a connection relationship between a cell monitoring IC and a battery cell assembly according to an exemplary embodiment.

In FIG. 6 a plurality of resistors RC1 and RC2 connected to the cell Cell5, cell balancing resistors RB1 and RB2, a cell balancing switch 305, a cell balancing controller 300, and a cell voltage measurement circuit 200 are illustrated.

The resistors RC1 and RC2 are connected in series between the positive electrode of the cell Cell5 and the terminal VC5, and the positive voltage of the cell Cell5 (or the negative voltage of Cell6) is transferred to the cell voltage measurement circuit 200 through the terminal VC5. The resistor RB1 is connected between the positive electrode of the cell Cell5 and the terminal CB5H, a first end of the cell balancing switch 305 is connected to the terminal CB5H, the resistor RB2 is connected between a negative electrode of the cell Cell5 and the terminal CB5L, and a second end of the cell balancing switch 305 is connected to the terminal CB5L. The cell balancing switch 305 performs a switching operation depending on a date signal VG5 supplied from the cell balancing controller 300.

The resistors RC1 and RC2 are connected in series between the negative electrode of the cell Cell5 and the terminal VC4, and the negative voltage of the cell Cell5 (or the positive voltage of Cell4) is transferred to the cell voltage measurement circuit 200 through the terminal VC4.

When the cell discharge switch 305 is turned on, the cell Cell5 is discharged along a discharge path BP1 that is formed of the cell Cell5, the cell balancing resistor RB1, the cell discharge switch 305, and the cell balancing resistor RB1.

Figure 7:
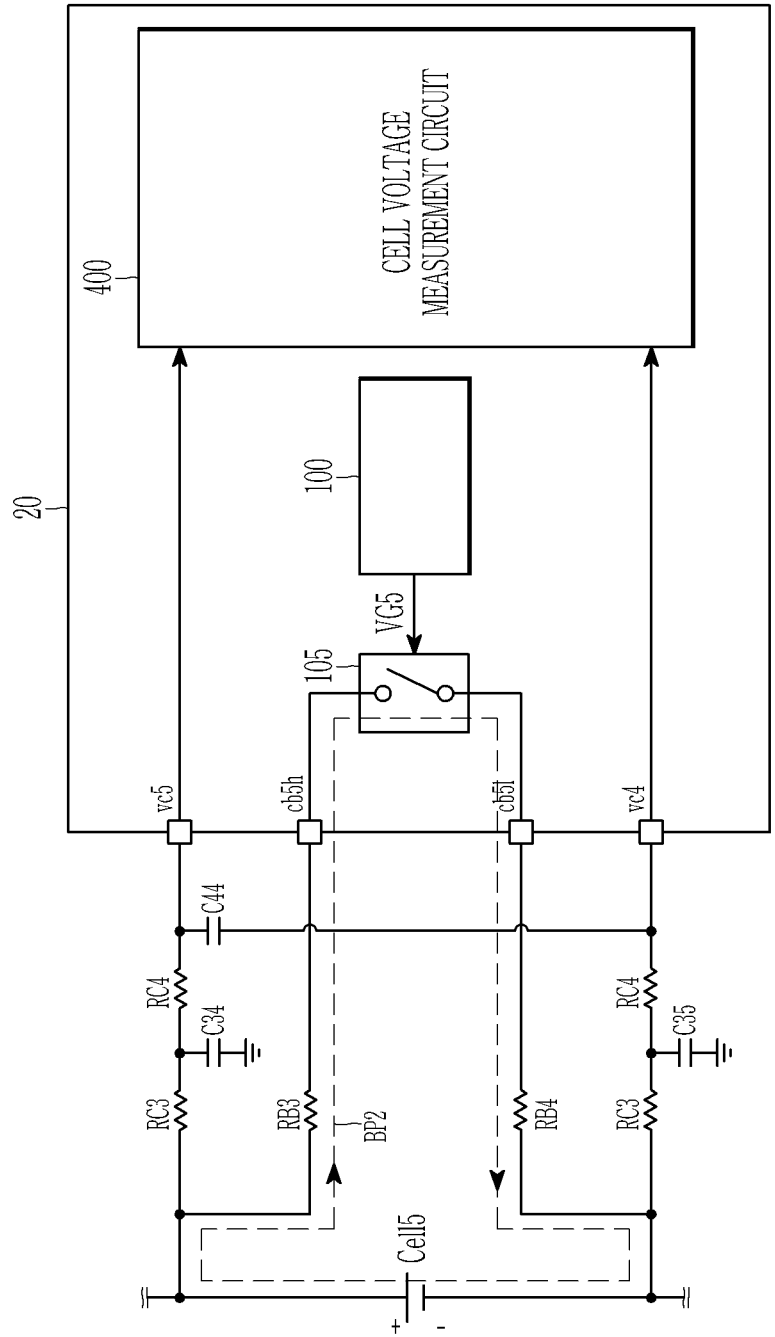
FIG. 7 illustrates a partial configuration showing a connection relationship between a cell balancing IC and a battery cell assembly according to an exemplary embodiment.

FIG. 7 illustrates a partial configuration showing a connection relationship between a cell balancing IC and a battery cell assembly according to an exemplary embodiment.

In FIG. 7, a plurality of resistors RC3 and RC4 connected to the cell Cell5, cell balancing resistors RB3 and RB4, a cell balancing switch 105, a cell balancing controller 100, and a cell voltage measurement circuit 400 are illustrated.

The resistors RC3 and RC4 are connected in series between the positive electrode of the cell Cell5 and the terminal vc5, and the positive voltage of the cell Cell5 (or the negative voltage of Cell5) is transferred to the cell voltage measurement circuit 400 through the terminal vc5. The resistor RB3 is connected between the positive electrode of the cell Cell5 and the terminal cb5$h$, a first end of the cell balancing switch 105 is connected to the terminal cb5$h$, the resistor RB4 is connected between a negative electrode of the cell Cell5 and the terminal cb5$l$, and a second end of the cell balancing switch 105 is connected to the terminal cb5$l$. The cell balancing switch 105 performs a switching operation depending on a gate signal VG5 supplied from the cell balancing controller 100.

The resistors RC3 and RC4 are connected in series between the negative electrode of the cell Cell5 and the terminal vc4, and the negative voltage of the cell Cell5 (or the positive voltage of Cell4) is transferred to the cell voltage measurement circuit 400 through the terminal vc4.

When the cell discharge switch 105 is turned on, the cell Cell5 is discharged along a discharge path BP2 that is formed of the cell Cell5, the cell balancing resistor RB3, the cell discharge switch 105, and the cell balancing resistor RB4.

Figure 8:
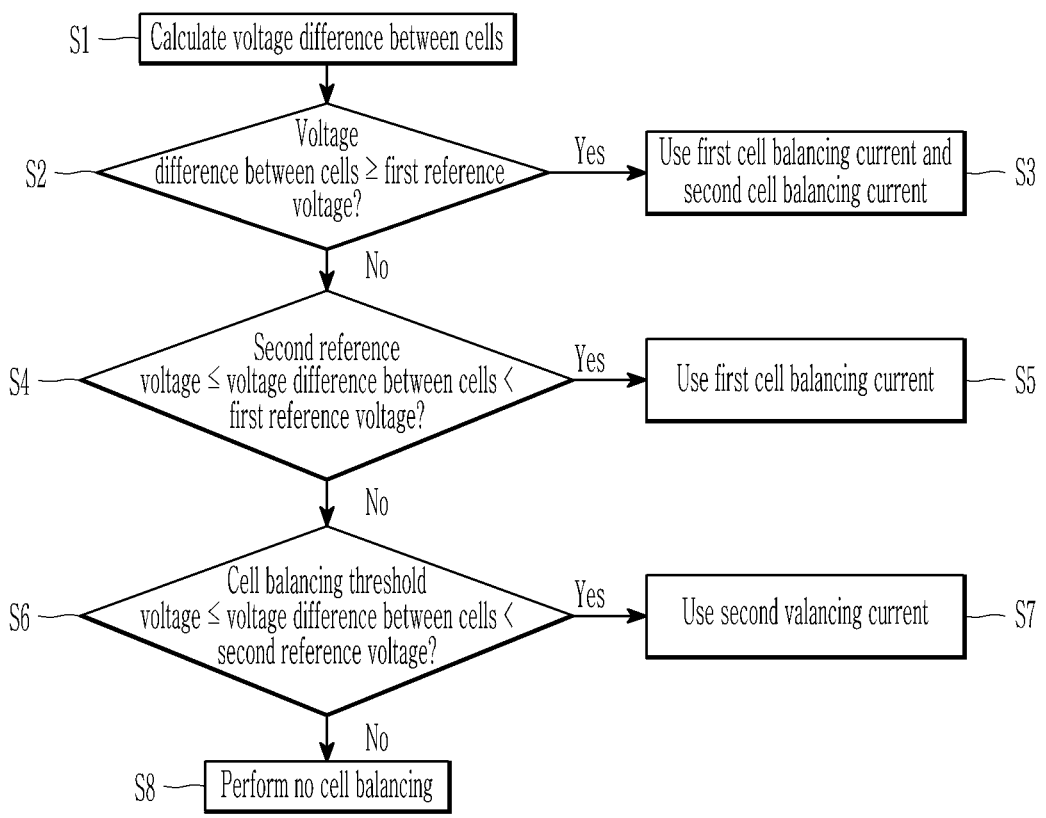
FIG. 8 illustrates a flowchart showing a cell balancing control method depending on a voltage difference between cells of a main control circuit according to an exemplary embodiment.

FIG. 8 illustrates a flowchart showing a cell balancing control method depending on a voltage difference between cells of a main control circuit according to an exemplary embodiment.

First, the main control circuit 30 calculates a voltage difference between the cells for each of the cells. The voltage difference between the cells may indicate a difference between a cell voltage of at least one of two cells adjacent to each of the cells and a cell voltage of the corresponding cell (S1).

The main control circuit 30 compares a voltage difference between the cells and the first reference voltage (e.g., 1 V) (S2), selects a cell having a voltage difference between the cells that is equal to or higher than the first reference voltage as a cell balancing target cell as a result of the comparison, and controls both the cell monitoring IC 20 and the cell balancing IC 10 to perform a cell balancing operation (S3). That is, a first cell balancing current (e.g., 100 mA) and a second cell balancing current (e.g., 60 mA) may flow through the first cell balancing resistors RB1 and RB2 and the second cell balancing resistors RB3 and RB4 connected to the corresponding cell in the cell monitoring IC 10 and the cell balancing IC 10.

When the voltage difference between the cells is lower than the first reference voltage in step S2, the main control circuit 30 compares the voltage difference between the cells and the second reference voltage (e.g., 0.5 V) (S4), selects a cell having a voltage difference between the cells that is lower than the first reference voltage and is higher than or equal to the second reference voltage as the cell balancing target cell as a result of the comparison, and controls the cell monitoring IC 20 to perform the cell balancing operation (S5). That is, in the cell monitoring IC 20, the first cell balancing current may flow through the first cell balancing resistors RB1 and RB2 connected to the corresponding cell.

When the voltage difference between the cells is lower than the second reference voltage in step S4, the main control circuit 30 compares the voltage difference between the cells and the cell balancing threshold voltage (S6), selects a cell having a voltage difference between the cells that is higher than or equal to the cell balancing threshold voltage as the cell balancing target cell as a result of the comparison, and controls the cell monitoring IC 10 to perform the cell balancing operation (S7). That is, in the cell balancing IC 10, the second cell balancing current may flow through the second cell balancing resistors RB3 and RB4 connected to the corresponding cell.

As a result of the comparison in step S6, when the voltage difference between the cells is smaller than the cell balancing threshold voltage, the cell balancing is not performed (S8).

In addition, the main control circuit 30 may differently control the cell balancing method depending on a temperature of each of the first cell balancing resistors and the second cell balancing resistors corresponding to each of the cells.

Figure 9:
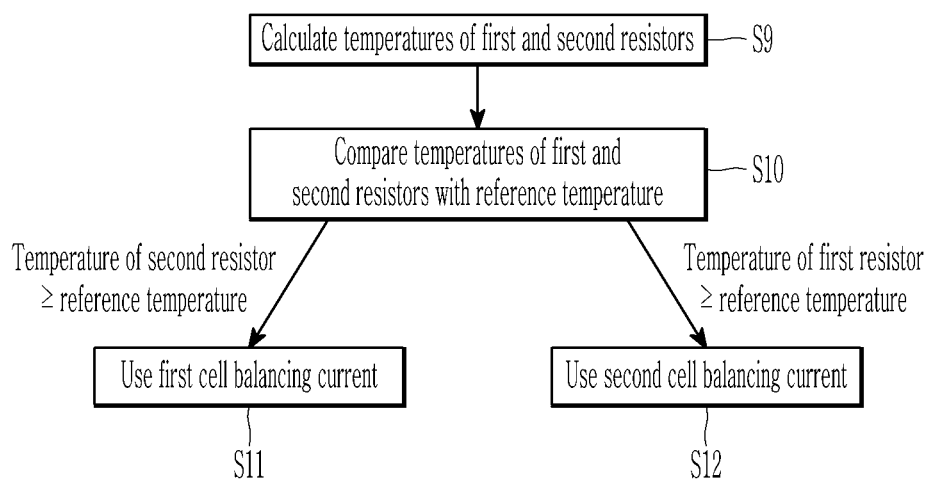
FIG. 9 illustrates a flowchart showing a cell balancing control method depending on a temperature of cell balancing resistors of a main control circuit according to an exemplary embodiment.

FIG. 9 illustrates a flowchart showing a cell balancing control method depending on a temperature of cell balancing resistors of a main control circuit according to an exemplary embodiment.

The main control circuit 30 calculates the temperature of each of the first cell balancing resistor and the second cell balancing resistor depending on a measurement value received from the temperature sensor 13 (S9).

When the temperature sensor 13 includes a plurality of temperature sensors disposed adjacent to the first cell balancing resistors and the second cell balancing resistors connected to each of the cells, the main control circuit 30 may receive a measurement value from each of the temperature sensors to calculate the temperature of each of the first cell balancing resistors and the second cell balancing resistors.

However, the present invention is not limited thereto, and the temperature sensor 13 may include a plurality of temperature sensors disposed adjacent to each of the first cell balancing resistors and the second cell balancing resistors connected to a cell at a specific location among the cells or at least two cells spaced apart from each other, or the like.

The main control circuit 30 compares the temperature of each of the first cell balancing resistors and the second cell balancing resistors with a reference temperature (e.g., 100 degrees) (S10). Hereinafter, the temperature of the first cell balancing resistors is referred to as a first resistance temperature, and the temperature of the second cell balancing resistors is referred to as a second resistance temperature.

When the second resistance temperature is higher than or equal to the reference temperature (e.g., 100 degrees) and the first resistance temperature is lower than the reference temperature as a result of the comparison in step S10, the cell balancing target cell is discharged by using the first cell balancing current through the first cell balancing resistors (S11).

When the first resistance temperature is higher than or equal to the reference temperature and the second resistance temperature is higher than or equal to the reference temperature as a result of the comparison in step S10, the cell balancing target cell is discharged by using the second cell balancing current through the second cell balancing resistors (S12).

The method of selecting the cell balancing target cell may depend on the flowchart shown in FIG. 8, For example, when the voltage difference between the cells is higher than or equal to the first reference voltage, the main control circuit 30 controls the cell monitoring IC 10 and the cell balancing IC 20 to discharge the corresponding cell through the first cell balancing resistors RB1 and RB2 and the second cell balancing resistors RB3 and RB4 by using the first cell balancing current and the second cell balancing current. However, in this case, the main control circuit 30 may control the cell monitoring IC 10 and the cell balancing IC 20 to use the second cell balancing resistors RB3 and RB4 when the temperature of the first cell balancing resistors RB1 and RB2 is higher than or equal to the reference temperature and to use the first cell balancing resistors RB1 and RB2 when the temperature of the second cell balancing resistors RB3 and RB4 is higher than or equal to the reference temperature. When the temperature of the first cell balancing resistors RB1 and RB2 is reduced from a temperature that is equal to or higher than the reference temperature to be lower than the reference temperature, the first cell balancing resistors RB1 and RB2 may also be used for the cell balancing. Similarly, when the temperature of the second cell balancing resistors RB3 and RB4 is reduced from a temperature that is equal to or higher than the reference temperature to be lower than the reference temperature, the second cell balancing resistors RB3 and RB4 may also be used for the cell balancing.

In addition, when the voltage difference between the cells is higher than or equal to the second reference voltage and is lower than the first reference voltage, the main control circuit 30 controls the cell monitoring IC 10 and the cell balancing IC 20 to discharge the corresponding cell through the first cell balancing resistors RB1 and RB2 by using the first cell balancing current. However, in this case, the main control circuit 30 may control the cell monitoring IC 10 and the cell balancing IC 20 to use the second cell balancing resistors RB3 and RB4 instead of the first cell balancing resistors RB1 and RB2 when the temperature of the first cell balancing resistors RB1 and RB2 is equal to or higher than the reference temperature. When the temperature of the first cell balancing resistors RB1 and RB2 is reduced from a temperature that is equal to or higher than the reference temperature to be lower than the reference temperature, the first cell balancing resistors RB1 and RB2 may also be used for the cell balancing, instead of the second cell balancing resistors RB3 and RB4.

In addition, when the voltage difference between the cells is higher than or equal to the cell balancing threshold voltage and is lower than the second reference voltage, the main control circuit 30 controls the cell monitoring IC 10 and the cell balancing IC 20 to discharge the corresponding cell through the second cell balancing resistors RB3 and RB4 by using the second cell balancing current. However, in this case, the main control circuit 30 may control the cell monitoring IC 10 and the cell balancing IC 20 to use the first cell balancing resistors RB1 and RB2 instead of the second cell balancing resistors RB3 and RB4 when the temperature of the second cell balancing resistors RB3 and RB4 is equal to or higher than the reference temperature. When the temperature of the second cell balancing resistors RB3 and RB4 is reduced from a temperature that is equal to or higher than the reference temperature to be lower than the reference temperature, the second cell balancing resistors RB3 and RB4 may also be used for the cell balancing, instead of the first cell balancing resistors RB1 and RB2.

As such, according to the present exemplary embodiment, the battery management system may perform cell balancing by using at least two cell balancing currents by adding a cell balancing IC, unlike using only an existing cell monitoring IC. Then, it is possible to reduce a time required for cell balancing by using a larger cell balancing current than that in the prior art, and provide an effect of performing more sophisticated cell balancing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A battery management system of a battery cell assembly including a plurality of cells, comprising:
a plurality of first cell balancing resistors and a plurality of first cell balancing switches, each first cell balancing resistor and each first cell balancing switch being connected between a positive electrode and a negative electrode of a corresponding first cell among the plurality of cells; and
a plurality of second cell balancing resistors and a plurality of second cell balancing switches, each second cell balancing resistor and each second cell balancing switch being connected between the positive electrode and the negative electrode of the corresponding first cell,
wherein a first cell balancing current flowing during an on period of each first cell balancing switch is greater than a second cell balancing current flowing during an on period of each second cell balancing switch, and
wherein each first cell balancing resistor includes:
a first resistor connected between the positive electrode of the respective first cell and a first end of the respective first cell balancing switch; and
a second resistor connected between the negative electrode of the respective first cell and a second end of the respective first cell balancing switch.

2. The battery management system of claim 1, wherein each second cell balancing resistor includes:
a third resistor connected between the positive electrode of the respective first cell and a first end of the respective second cell balancing switch; and
a fourth resistor connected between the negative electrode of the respective first cell and a second end of the respective second cell balancing switch.

3. The battery management system of claim 1, wherein the first cell balancing switches and the second cell balancing switches are turned on when a voltage difference between the first cells and at least one cell adjacent to the first cells, is higher than or equal to a first reference voltage.

4. The battery management system of claim 3, wherein each first cell balancing switch is turned on when the voltage difference is higher than or equal to a second reference voltage and lower than the first reference voltage.

5. The battery management system of claim 4, wherein each second cell balancing switch is turned on when the voltage difference is higher than or equal to a cell balancing threshold voltage and lower than the second reference voltage.

6. The battery management system of claim 1, wherein when a temperature of each first cell balancing resistor is higher than or equal to a reference temperature and the temperature of each second cell balancing resistor is lower than the reference temperature, cell balancing of each first cell is controlled by using the respective second cell balancing resistor.

7. The battery management system of claim 1, wherein when a temperature of each second cell balancing resistor is higher than or equal to a reference temperature and the temperature of each first cell balancing resistor is lower than the reference temperature, cell balancing of each first cell is controlled by using the respective first cell balancing resistor.

8. A battery management system of a battery cell assembly including a plurality of cells, comprising:
a cell monitoring IC including a plurality of first cell balancing switches corresponding to the plurality of cells, the first cell balancing switches being connected to the plurality of cells through first cell balancing resistors;
a cell balancing IC including a plurality of second cell balancing switches corresponding to the plurality of cells, the second cell balancing switches being connected to the plurality of cells through second cell balancing resistors;
a main control circuit configured to:
calculate a voltage difference between the plurality of cells based on received cell voltages of the plurality of cells,
determine a cell balancing target cell depending on results of comparing the voltage difference between the plurality of cells with a first reference voltage, a second reference voltage, and a cell balancing threshold voltage, and
control a cell balancing operation by using at least one of the cell monitoring IC and the cell balancing IC depending on the comparison results; and
wherein the voltage difference between the plurality of cells is a difference between a cell voltage of each of the plurality of cells and at least one cell adjacent to each of the plurality of cells.

9. The battery management system of claim 8, wherein a first cell balancing current flowing through a turned-on first cell balancing switch among the first cell balancing switches is larger than a second cell balancing current flowing through a turned-on second cell balancing switch among the second cell balancing switches.

10. The battery management system of claim 9, wherein the main control circuit controls the cell monitoring IC and the cell balancing IC to turn on both the first cell balancing switch and the second cell balancing switch connected to a cell among the plurality of cells having the voltage difference that is higher than or equal to the first reference voltage.

11. The battery management system of claim 10, wherein the main control circuit controls the cell monitoring IC and the cell balancing IC to turn on the respective first cell balancing switch connected to a cell among the plurality of cells having the voltage difference that is higher than or equal to the second reference voltage and lower than the first reference voltage.

12. The battery management system of claim 11, wherein the main control circuit controls the cell monitoring IC and the cell balancing IC to turn on the second cell balancing switch connected to a cell among the plurality of cells having the voltage difference that is higher than or equal to the cell balancing threshold voltage and lower than the second reference voltage.

13. The battery management system of claim 8, wherein the main control circuit controls the cell monitoring IC and the cell balancing IC to perform cell balancing of a first cell among the plurality of cells by using the respective second cell balancing resistor connected to the first cell, when the temperature of the respective first balancing resistor of the first cell is equal to or higher than a reference temperature.

14. The battery management system of claim 8, wherein the main control circuit controls the cell monitoring IC and the cell balancing IC to perform cell balancing of a first cell among the plurality of cells by using the respective first cell balancing resistor connected to the first cell, when a temperature of the respective second balancing resistor is equal to or higher than a reference temperature.

15. A battery management system of a battery cell assembly including a plurality of cells, comprising:
a plurality of first cell balancing resistors and a plurality of first cell balancing switches, each first cell balancing resistor and each first cell balancing switch being connected between a positive electrode and a negative electrode of a corresponding first cell among the plurality of cells;
a plurality of second cell balancing resistors and a plurality of second cell balancing switches, each second cell balancing resistor and each second cell balancing switch being connected between the positive electrode and the negative electrode of the corresponding first cell; and
a main control circuit configured to:
calculate a voltage difference between the plurality of cells based on received cell voltages of the plurality of cells,
determine a cell balancing target cell depending on results of comparing the voltage difference between the plurality of cells with a first reference voltage, a second reference voltage, and a cell balancing threshold voltage.

\* \* \* \* \*